United States Patent

Orns

[15] 3,679,256
[45] July 25, 1972

[54] OVERHEAD GUARD FOR LIFT TRUCK

[72] Inventor: James L. Orns, Battle Creek, Mich.
[73] Assignee: Clark Equipment Company
[22] Filed: May 10, 1971
[21] Appl. No.: 141,889

[52] U.S. Cl. ..........................................................296/102
[51] Int. Cl. .......................................................B62d 25/06
[58] Field of Search ..............................296/102; 280/150 C; 214/DIG. 7

[56] References Cited

UNITED STATES PATENTS

| | | | |
|---|---|---|---|
| 3,289,871 | 12/1966 | Tourneau | 296/102 |
| 3,472,550 | 10/1969 | Marco | 296/102 |
| 3,502,368 | 3/1970 | Maxa | 296/102 |

*Primary Examiner*—Benjamin Hersh
*Assistant Examiner*—Robert R. Song
*Attorney*—Kenneth C. Witt, John C. Wiessler, Robert H. Johnson, Lewis J. Lamm and Robert J. Norton

[57] ABSTRACT

An overhead guard for the protection of operators of lift trucks of a type in which the rear truck portion is housed in hinged and transversely swingable doors or body housing portions to permit ready access to the rearwardly located truck operating components. The rear support legs of the overhead guard may be quickly connected to and detached from the swingable doors by an adjustable sleeve and short support legs which are secured to the doors.

7 Claims, 6 Drawing Figures

INVENTOR
JAMES L. ORNS
BY
ATTORNEY

INVENTOR
JAMES L. ORNS
ATTORNEY

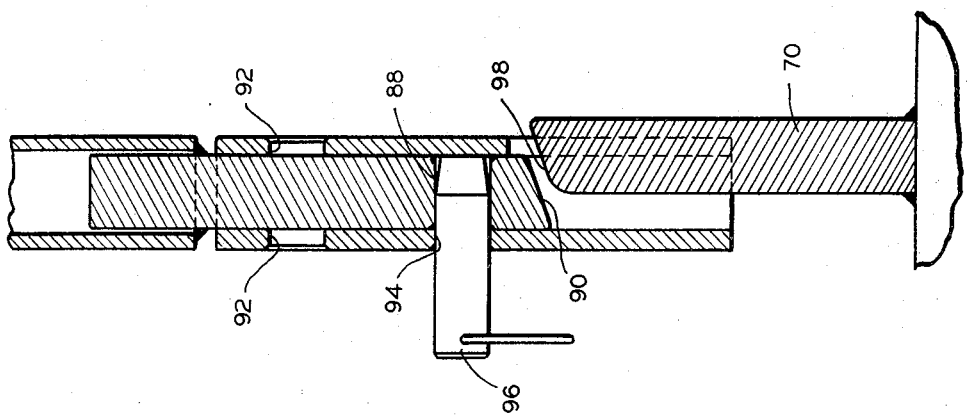
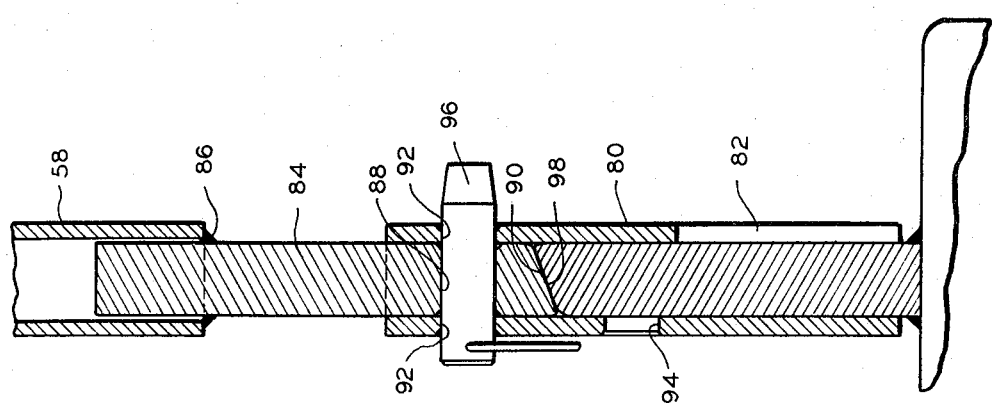
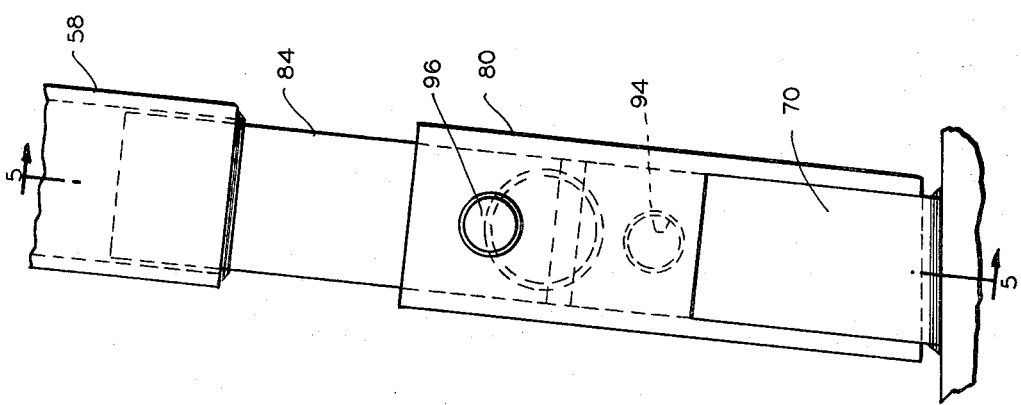
INVENTOR
JAMES L. ORNS
BY
ATTORNEY

OVERHEAD GUARD FOR LIFT TRUCK

BACKGROUND OF THE INVENTION

Rapid access to the operating components of lift trucks is important in maximizing efficiency in servicing and maintaining such vehicles. Overhead guards have been long known in the art and are an important safety feature in protecting lift truck operators from injury resulting from objects falling from above. Overhead guard constructions have previously often presented certain problems in respect of enabling quick access to various truck operating components without the necessity of removing or disassembling the guard structure. Various methods and apparatus have been devised previously for enabling relatively rapid access to truck components and compartments in four-wheel type lift trucks. Representative of such prior methods and apparatus are U.S. Pat. Nos. 2911232 and 3289871, and U.S. application Ser. No. 34713, filed May 4, 1970, all assigned to the assignee of the present invention. However, none such prior art solved satisfactorily the above problem in respect of a three-wheeled lift truck in which a pair of non-dirigible drive wheels are located at the forward end of the truck and a single centrally located steerwheel is positioned at the rear of the truck, on either side and above which are ordinarily located numerous operating components of the truck, including truck controls, circuit and steering components. A pair of hinged and outwardly swingable body housing portions or doors are adapted to form a closed rear compartment surrounding all such components when in a closed condition, and to fully expose all such rearwardly located components when in an open condition. It is known to provide in such a truck a relatively rapid connecting means between the rear legs of the overhead guard and the swingable doors. The present invention involves an improved overhead guard structure for rapid connection and disconnection with a pair of such swingable body portions so as to involve essentially no interference with efficient servicing and maintenance of the truck.

SUMMARY OF THE INVENTION

My invention solves the problem of providing quick access to the rear compartment of a three-wheel lift truck in an improved manner, and it is a primary object of the invention to provide such quick access while utilizing a rugged design.

Another object is to provide a rigid guard structure for such lift trucks which is yet capable of extremely rapid operative connection and disconnection with movable rear portions of the truck.

Other objects, features and advantages of the invention will become apparent to persons skilled in the art from the following detailed description.

BRIEF DESCRIPTION OF THE DRAWING

FIG. 4 is an enlarged partial side elevational view of the lower end of the right-hand rear leg of the guard showing details of the connecting structure;

FIG. 5 is a section taken along line 5—5 of FIG. 4; and

FIG. 6 is a view similar to FIG. 5 but illustrates the end leg guard structure in a disconnected condition similar to the showing thereof in FIG. 3.

DESCRIPTION OF THE PREFERRED EMBODIMENT

Figure 1:
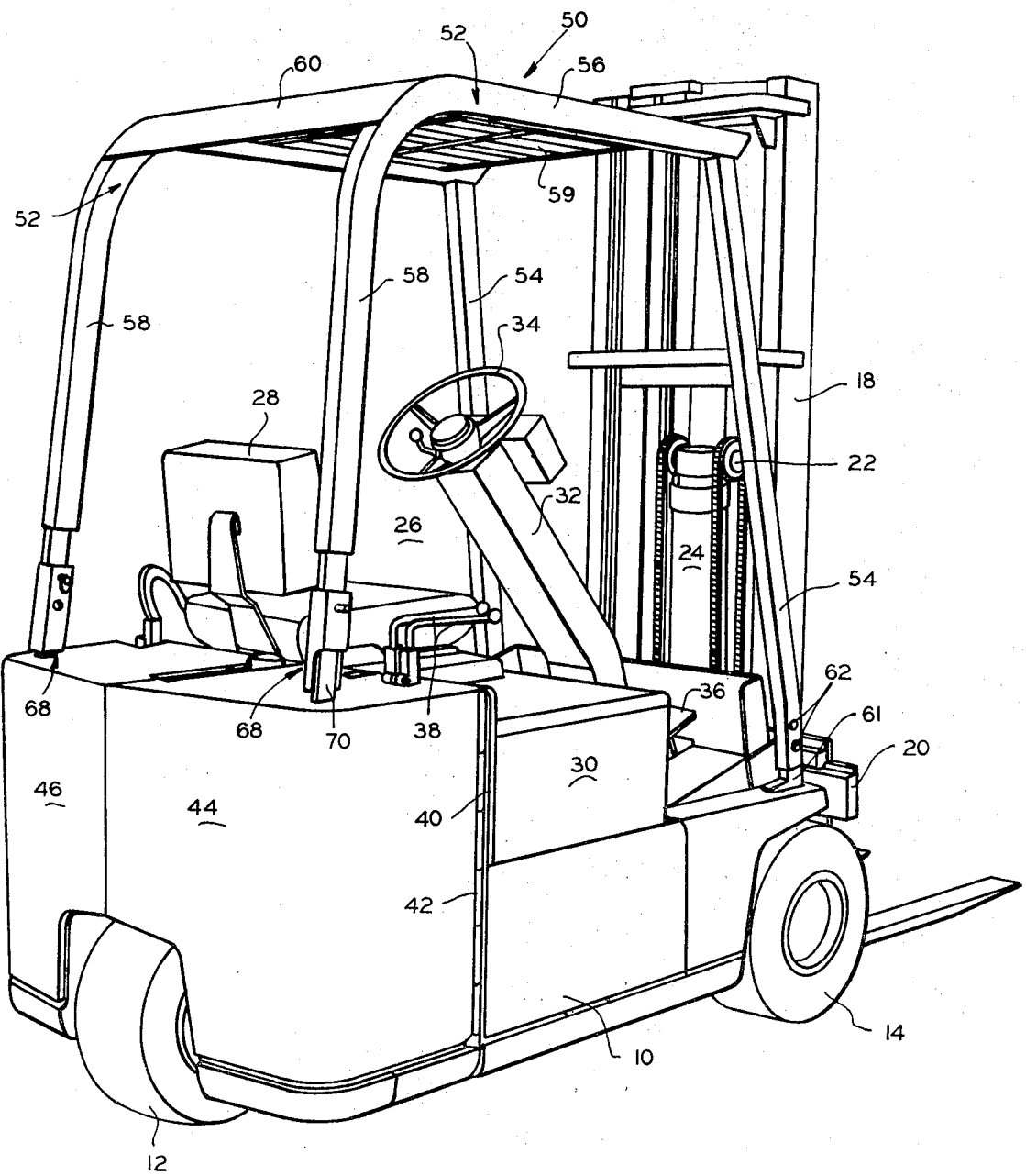
FIG. 1 is a rear quarter perspective view of a three-wheeled lift truck showing the overhead guard of my invention connected in operative position on the truck.

Referring now to the drawing, the industrial lift truck shown in FIG. 1 is particularly suitable for use with my invention. It includes generally a body 10 which is supported by a non-powered rear dirigible wheel 12 and a pair of non-dirigible front drive wheels 14, one of which is shown. Mounted on the truck at the forward end thereof is a lift truck mast construction 18 of known design which includes generally a fork carriage 20 elevatable in the upright by means of suitably oriented pairs of sprockets and chains 22 actuated by a telescopic hydraulic ram construction 24 operatively connected both to the carriage 20 and to one or more inner telescopic members of upright 18 through chains and sprockets 22 in known manner for elevating the fork carriage 20 in the upright.

The truck is also provided with an operator's station 26 supported from the body 10 and including an operator's seat 28 and controls, and a power source which include a battery means 30, a steering control console 32, a steering wheel 34, floor mounted accelerator and brake pedals, one of which is shown at 36, upright elevation and tilt controls 38, and other controls not pertinent to the present invention. A transverse structural plate member 40 supports at opposite sides of the truck a pair of vertical hinge means 42 from which are mounted a pair of body housing or door portions 44 and 46 swingable transversely outwardly in opposite directions to expose totally the operating circuitry, components and controls of the truck which are located inside the compartment formed by the truck body 10, plate 40, and body portions 44 and 46, including enclosure of the hydromechanical power steering means associated with dirigible wheel 12, as partially shown in FIG. 3 at numeral 48, an oil reservoir, not shown, for supplying lift cylinder 24, and an oil reservoir 49 for supplying the hydraulic system of the truck.

An overhead guard assembly 50 comprises generally a pair of inverted U-shaped transversely spaced and parallel leg assemblies 52, each of which includes a forward leg 54, an upper horizontal leg 56, and a downwardly extending rear leg 58. An overhead guard screen or grid 59 and plate member 60 is secured to opposite upper horizontal leg members 56 thereby forming a protective grid above the operator. At opposite sides of the front end of the truck are located on the upper horizontal surfaces of side portions of body 10 a pair of L-shaped feet 61 secured, as by welding, to the body and extending upwardly for telescopic engagement with the hollow lower ends of upwardly extending legs 54, each secured on foot members 52 by a pair of bolts 62. The lower end assembly 68 of each rear leg member 58 is uniquely constructed and is adapted to cooperate with a relatively short upwardly extending rigid leg member 70 which may be secured, as by welding, adjacent the rear corner portion of each hinged body portion 44 and 46. In practice leg members 70 are mounted in slotted plate members, not shown, connected to body portions 44 and 46 for limited longitudinal adjustment as may be required to align properly the leg member 70 with the adjacent rear guard leg member 58. For purposes of the invention, however, it is not necessary to disclose that adjustment feature.

As shown in FIGS. 1, 2, 4 and 5, the rear body portions 44 and 46 are closed and the rear legs 58 of the overhead guard assembly are secured to the lower short leg portions 70 by lower end assemblies 68, thereby forming a rigid inverted U-shaped guard assembly 50 secured fore and aft of the truck.

Figure 3:
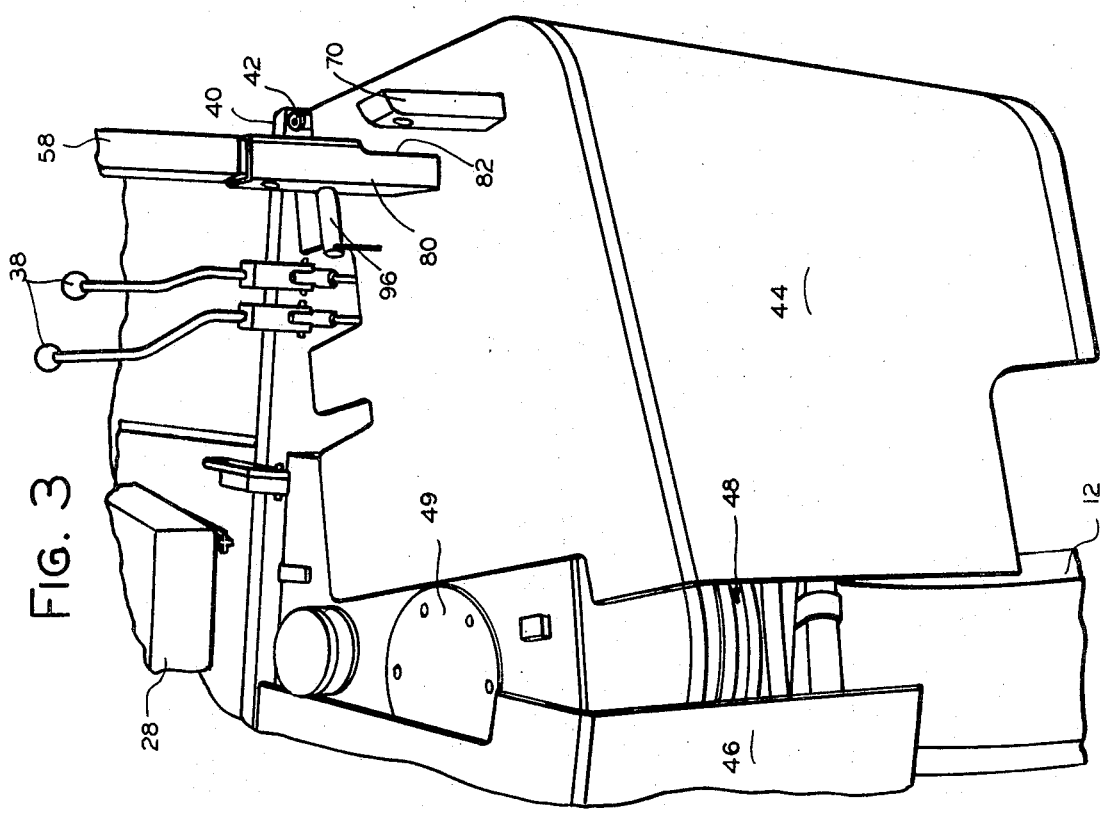
FIG. 3 is a view similar to FIG. 2 but shows the right-hand swingable rear door in a partially open condition with the rear guard portion disconnected therefrom.
Figure 2:
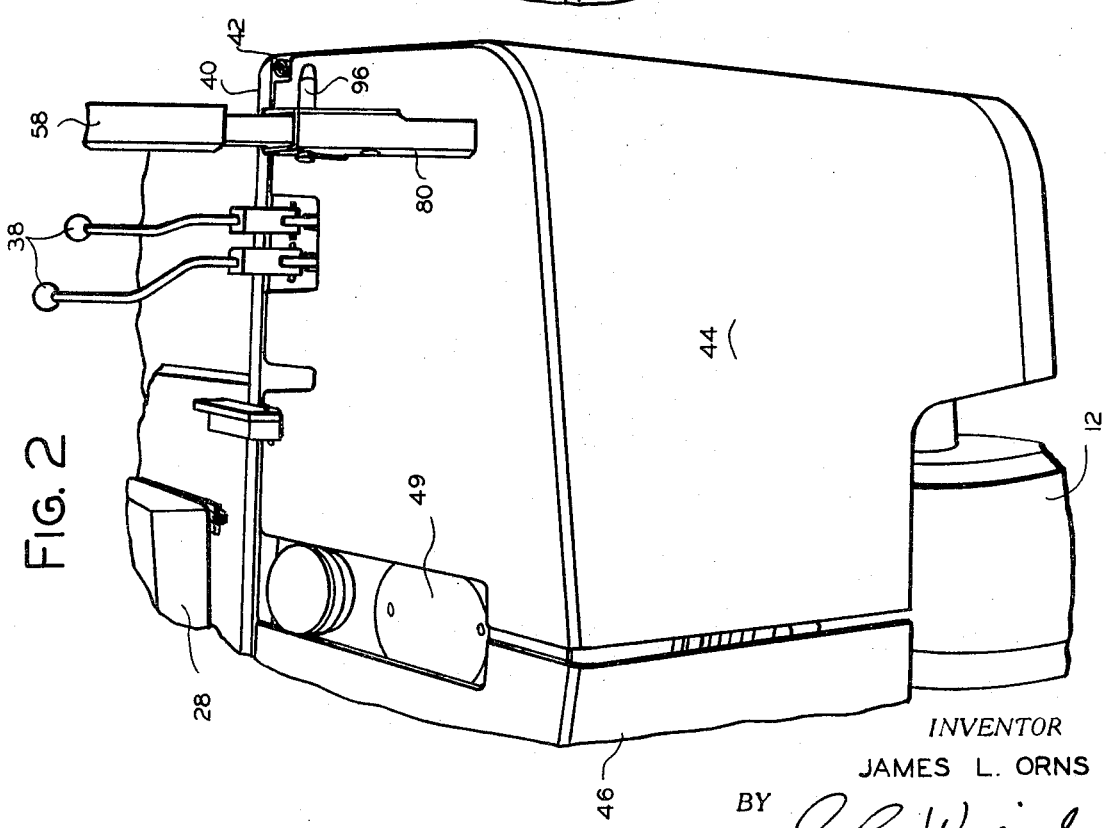
FIG. 2 is an enlarged rear perspective view of the right rear portion of the truck as shown in FIG. 1.

In FIGS. 3 and 6, on the other hand, the right rear leg member 58 is disconnected from rigid leg member 70 and rear body portion 44 is pivoted open partially outwardly to expose a portion of the one rear interior side portion of the truck. It will be understood that either one or both rear leg portions can be disconnected from the respective rear body portions to provide ready access to either or both interior rear side portions of the truck. Further, it will be observed that when one side only of the guard structure is disconnected as in FIG. 3 that that corner portion of the guard is cantilevered from a three point connection of the guard at the forward end and opposite rear side, whereas when both rear leg portions are disconnected and the rear body portions 44 and 46 swung outwardly in opposite directions, the entire guard assembly is cantilevered from the two secured locations on foot members 61 at the front of the truck. It will be readily seen that unobstructed and ready access to selected rear portions of the truck is readily available, and that a tendency of the cantilevered rear portion of the guard to sag a slight amount downwardly when it is disconnected and both rear body portions are pivoted outwardly, facilitates a fixed and rigid rear leg engagement and structure when the guard is in fully operative condition (FIG. 1), as will become more apparent as the description proceeds.

The lower end portion 68 of each rear leg comprises an assembly which is adapted to be selectively connected or disconnected from the corresponding upstanding leg portion 70 of each rear housing portion 44 and 46. A sleeve member 80 having an outer lower side cutout portion 82 is slidably mounted upon a downwardly extending projection 84 which is secured, as by welding at 86 to the lower end of each hollow rear leg portion 58, said projection including a transverse opening 88 formed near the lower end thereof and an end surface 90 biased outwardly and upwardly of the truck as shown in FIGS. 5 and 6. Coaxial openings 92, 92 are formed in both side portions of the sleeve whereas an opening 94 is formed in one side only of the sleeve and below openings 92. When the sleeve is actuated to its up position as shown in FIG. 6, a member such as pin 96 may be inserted into coaxially aligned openings 94 and 88 thereby holding the sleeve in its FIG. 6 position. Body portion 44 may thereupon be pivoted from an open to a closed position (or vice versa) which moves by member 70 through sleeve opening 82 as in FIG. 6 into abutment with the opposite side of the sleeve in which position complementary biased surfaces 90 and 98 abut as in FIG. 5. When upper and lower members 84 and 70 are in full abutting relationship as in FIGS. 1, 2, 4 and 5, pin 96 is disengaged from openings 88 and 94 sleeve 80 is lowered to the FIG. 5 position thereof in which openings 88 and 92 align axially and pin 96 is inserted as in FIG. 5 to maintain the relationship of parts there shown. In this condition leg member 70 is surrounded by the walls of hollow rectangular sleeve 80 which locks in rigid and fixed relationship the entire guard structure relative to the truck. The inner and side wall portions of sleeve 80 function as guides during closing movement of body portion 44 and insure proper alignment of members 70 and 84. Weld 86 functions as a stop limiting upward movement of the sleeve. Closing body portion 46 produces a similar relationship of parts on the opposite side of the truck.

In order to open one or more rear compartments within rear body portions 44 and 46, it is necessary merely to pull the pin(s) 96 from its FIG. 5 location, elevate sleeve(s) 80 to the FIG. 6 position and reinsert pin(s) 96 as shown which permits disengagement of upper and lower projections 84 and 70. Swinging open body portions 44 and/or 46 actuates each body portion and leg member 70 outwardly of projection 84 thereby separating biased surfaces 90 and 98 which may be utilized as camming means for facilitating mating and disengagement of projections 84 and 70.

Although only one embodiment of my invention has been illustrated and described, it will be apparent to those skilled in the art that various changes in the form and arrangement of the parts may be made to suit requirements without departing from the scope of the invention.

I claim:

1. For use with industrial lift trucks having front and rear portions and an intermediate operator's station, said rear portion including a swingable body cover portion hingedly connected at one side of the truck for pivotable movement outwardly of the truck about a vertical axis, an overhead guard comprising a generally inverted U-shaped guard structure secured rigidly to the front portion, extending rearwardly over the operator's station and thence projecting downwardly in spaced essentially parallel rear legs, and means for connecting to and disconnecting from said rear body portion one of the rear leg end portions including an upwardly projecting member secured to said rear body portion which is adapted to align substantially axially with the rear leg end portion, and an elongated slidable sleeve member mounted on the end portion of the rear leg having a pair of axially spaced openings extending transversely through at least one side of said sleeve, an opening extending transversely through the end portion of said rear leg, said sleeve being movable axially of said rear leg end portion for aligning a selected one of the spaced openings in said sleeve with the opening in said rear leg, and a member for engaging either pair of said aligned openings, said sleeve being held in an up position when one of said pair of openings is engaged by said latter member to allow disconnection of the said rear body portion and pivotal movement outwardly from said rear leg and being held in a down position when the other of said pair of openings is engaged by said latter member in which down position the rear leg end portion and the upwardly projecting member are substantially axially aligned for holding the same in a fixed relative position.

2. An industrial truck as claimed in claim 1 wherein a second swingable body cover portion is hinged at the opposite side of the truck for opposite pivotal movement about a second vertical axis, and the other rear leg has an end portion of a construction like that of the one rear leg end portion and in allochiral relation thereto, and a second upwardly projecting member secured to said second rear body portion and adapted to be connected and disconnected from the other rear leg end portion in a manner similar to the connection and disconnection of the first mentioned upwardly projecting member to the one rear leg end portion.

3. An overhead guard as claimed in claim 1 wherein the end surfaces of said upwardly projecting member and rear leg end portion are biased downwardly and inwardly of the truck such that a load on the overhead guard tends to move the rear leg inwardly of the truck along the biased surfaces.

4. An overhead guard as claimed in claim 1 wherein said sleeve member has an opening at the lower end and in the outer side permitting passage of the upwardly projecting member through said opening during swinging movement of the rear body portion in or out of engagement with the rear leg when the sleeve member is located in a raised portion.

5. An overhead guard as claimed in claim 4 wherein said sleeve member also includes a closed inner wall at its lower end which functions as a stop member during swinging movement of the rear body portion into operative relation with the rear leg.

6. An overhead guard as claimed in claim 1 wherein the main rear leg of the guard is hollow, the rear leg end portion includes a downward solid projection at the lower end of smaller cross section than the main rear leg portion, said sleeve member surrounding said solid projection, and a stop limiting upward movement of the sleeve member at the place of connection between the solid projection and the main rear leg.

7. An overhead guard as claimed in claim 1 wherein the upper sleeve opening extends entirely through the sleeve portion and the lower sleeve opening extends through only one side wall thereof.

* * * * *